(12) United States Patent
Brenninger

(10) Patent No.: US 10,411,365 B2
(45) Date of Patent: Sep. 10, 2019

(54) GROUND CONNECTION FOR AN ALUMINIUM COMPONENT

(71) Applicant: Bayerische Motoren Werke Aktiengesellschaft, Munich (DE)

(72) Inventor: Gerhard Brenninger, Schwindkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/843,156

(22) Filed: Dec. 15, 2017

(65) Prior Publication Data
US 2018/0109008 A1 Apr. 19, 2018

Related U.S. Application Data

(63) Continuation of application No. PCT/EP2016/064810, filed on Jun. 27, 2016.

(30) Foreign Application Priority Data

Sep. 11, 2015 (DE) ........................ 10 2015 217 383

(51) Int. Cl.
*H01R 4/30* (2006.01)
*H01R 4/02* (2006.01)
(Continued)

(52) U.S. Cl.
CPC ............ *H01R 4/029* (2013.01); *B23K 1/0008* (2013.01); *H01R 4/625* (2013.01); *H01R 4/64* (2013.01);
(Continued)

(58) Field of Classification Search
CPC .......... H01R 4/64; H01R 11/283; H01R 4/34; H01R 11/12; F16B 41/002; B23P 19/062
(Continued)

(56) References Cited

U.S. PATENT DOCUMENTS 2,076,209 A * 4/1937 Rowe ..................... H01R 4/363
439/798
4,643,511 A * 2/1987 Gawlik ................ H01R 11/289
439/755
(Continued)

FOREIGN PATENT DOCUMENTS

CN 101019276 A 8/2007
CN 105555455 A 5/2016
(Continued)

OTHER PUBLICATIONS

German Search Report issued in counterpart German Application No. 10 2015 217 383.6 dated Sep. 11, 2015 with partial English-language translation (Fifteen (15) pages).
(Continued)

*Primary Examiner* — Thanh Tam T Le
(74) *Attorney, Agent, or Firm* — Crowell & Moring LLP

(57) ABSTRACT

A ground connection for an aluminum component has grounding bolt which is fastened to the component, with an adapter over the surface, and which is composed of a material having greater strength than the aluminum component and differs from the aluminum component in electro-chemical series and has a thread element which clamps the cable shoe of the ground conductor on a corresponding contact area of the grounding bolt. Permanently high functional reliability is obtained by the grounding bolt and the adapter being composed of materials matched to one another so as to prevent corrosion and connected to one another in a cohesive manner, and the adapter is zinc-plated on the component side and is fastened to the component over a large surface area by a welded/soldered connection which is established using aluminum as an additional material.

8 Claims, 1 Drawing Sheet

(51) Int. Cl.
*H01R 4/62* (2006.01)
*H01R 4/64* (2006.01)
*H01R 13/621* (2006.01)
*B23K 1/00* (2006.01)
B23K 101/34 (2006.01)
B23K 103/20 (2006.01)

(52) U.S. Cl.
CPC ........ *H01R 13/621* (2013.01); *B23K 2101/34* (2018.08); *B23K 2103/20* (2018.08); *H01R 2201/26* (2013.01)

(58) Field of Classification Search
USPC ........... 439/92, 766, 801, 883; 411/107, 181
See application file for complete search history.

(56) References Cited

U.S. PATENT DOCUMENTS

| | | | | |
|---|---|---|---|---|
| 4,650,274 A * | 3/1987 | Schmid | ............... | H01R 4/64 439/801 |
| 4,980,789 A * | 12/1990 | Hopkinson | ............... | H01T 4/08 361/126 |
| 5,442,133 A * | 8/1995 | Arnold | ............... | B23K 35/0288 174/51 |
| 5,487,685 A * | 1/1996 | Stillback | ............... | F16B 37/061 439/801 |
| 6,398,595 B2 * | 6/2002 | Wakata | ............... | H01R 11/282 429/1 |
| 7,047,868 B2 * | 5/2006 | Nolan | ............... | F16J 1/22 92/187 |
| 7,056,161 B2 * | 6/2006 | Delcourt | ............... | H01R 4/30 174/51 |
| 7,083,479 B2 * | 8/2006 | Muller | ............... | H01R 4/64 439/801 |
| 7,553,200 B2 * | 6/2009 | Plummer | ............... | H01R 4/304 439/766 |
| 7,641,522 B2 * | 1/2010 | Carcangiu | ............... | H01R 4/366 439/271 |
| 8,246,654 B2 * | 8/2012 | Varela | ............... | A61B 17/7064 606/247 |
| 8,403,570 B2 * | 3/2013 | Fisher | ............... | G02B 6/3878 385/70 |
| 8,486,116 B2 * | 7/2013 | Heilman | ............... | A61B 17/8047 606/286 |
| 8,918,993 B2 * | 12/2014 | Braden | ............... | H01R 4/646 29/844 |
| 2007/0240897 A1 | 10/2007 | Gafri et al. | | |
| 2016/0059340 A1 | 3/2016 | Hill et al. | | |

FOREIGN PATENT DOCUMENTS

| | | |
|---|---|---|
| DE | 101 02 444 A1 | 11/2002 |
| DE | 102 49 918 A1 | 2/2004 |
| DE | 10 2007 028 164 A1 | 12/2008 |
| DE | 10 2009 004 937 A1 | 8/2009 |
| DE | 10 2011 051 137 A1 | 12/2012 |
| WO | WO 2014/172629 A1 | 10/2014 |

OTHER PUBLICATIONS

International Search Report (PCT/ISA/210) issued in PCT Application No. PCT/EP2016/064810 dated Sep. 15, 2016 with English-language translation (Five (5) pages).

German-language Written Opinion (PCT/ISA/237) issued in PCT Application No. PCT/EP2016/064810 dated Sep. 15, 2016 (Nine (9) pages).

English translation of Japanese Office Action issued in counterpart Japanese Application No. 201680031486.2 dated Nov. 2, 2018 (eight (8) pages).

* cited by examiner

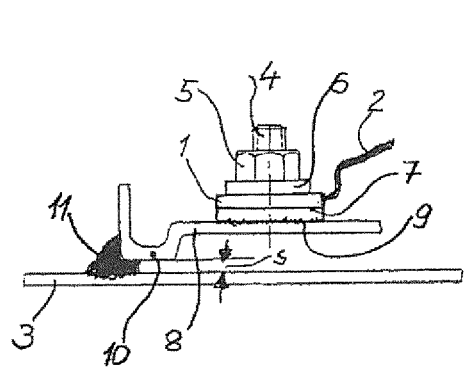
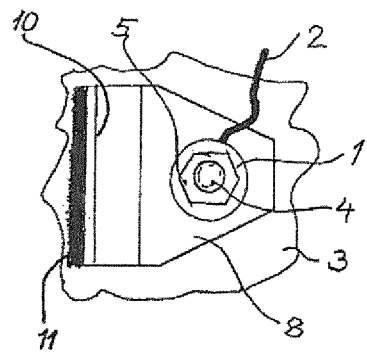
Fig. 1A            Fig. 1B
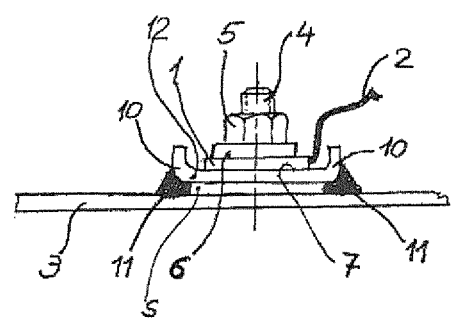
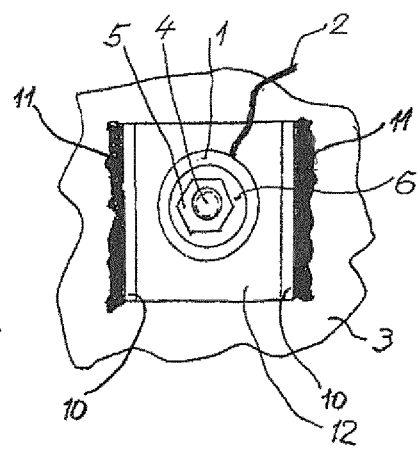
Fig. 2A            Fig. 2B

GROUND CONNECTION FOR AN ALUMINIUM COMPONENT

CROSS REFERENCE TO RELATED APPLICATIONS

This application is a continuation of PCT International Application No. PCT/EP2016/064810, filed Jun. 27, 2016, which claims priority under 35 U.S.C. § 119 from German Patent Application No. 10 2015 217 383.6, filed Sep. 11, 2015, the entire disclosures of which are herein expressly incorporated by reference.

BACKGROUND AND SUMMARY OF THE INVENTION

The invention relates to a ground connection for an aluminum component, especially a vehicle body component, having a grounding bolt which is fastened to said component, with the interposition of an adapter that extends over the surface and which is composed of a material which exhibits greater strength than the aluminum component and differs in the electrochemical potential series, especially steel, and having a thread element which clamps the cable shoe of the ground conductor on a corresponding contact area of the ground connection.

From DE 102 49 918 A1, a ground connection of this kind is known for aluminum components with a grounding bolt made of steel, wherein an adapter in the form of a sleevelike spacer made from a material compatible with the aluminum component, i.e., preferably also aluminum, is interposed between the bolt and the aluminum component. The grounding bolt is connected in a rotationally firm manner to the spacer by form fit and/or friction locking. The problem with this known ground connection is its pronounced tendency to corrode at the interface between the steel bolt and the aluminum adapter and the resulting electrical junction resistance to the cable shoe of the ground conductor for the sometimes extremely high current flow of up to 1000 A or more. Furthermore, the thread element needs to be tightened with a very large torque in relation to its size, in order to tighten the cable shoe of the ground conductor in mechanically firm manner to the ground connection, but on account of the material of the form fit and/or friction locking connection of the grounding bolt to the aluminum adapter it has limited torque strength and therefore often does not withstand the required tightening torque.

The problem which the invention proposes to solve is to modify a ground connection of the kind mentioned at the outset so that it guarantees a permanently high functional reliability by a simple manufacturing method.

This problem is solved according to the invention by the ground connection in accordance with embodiments of the invention.

According to the invention, the functional reliability of the ground connection is significantly improved in several respects. Thus, the loading strength of the ground connection and thus the permissible tightening torque of the thread element are significantly increased in that the interface between grounding bolt and adapter is cohesive, i.e., formed either as a single piece as preferred or as a thermal welding connection, and the interface between adapter and component has a large surface area and a high level of load strength as a combined connection welded with aluminum as additional material at the component side and soldered with the zinc plating as flux on the adapter side. At the same time, the ground connection has a significantly improved corrosion resistance, because the grounding bolt and the adapter are the same material and therefore joined together without an electrochemical potential difference and the adapter is held without contact with the component at the other interface and the intervening gap is bridged by a controlled material transfer in the welded/soldered connection. Finally, the ground connection also presents a very low electrical junction resistance, since in addition to the high electrical conductivity of the materials used the individual connection sites can also easily be dimensioned with a large flow cross section, suitable to the required current loads. Furthermore, the ground connection according to the invention is easy to produce, suitable for serial production, and easy to install.

Another fabrication simplification consists in that the welded/soldered connection is produced as a fillet weld running continuously in a straight line between the adapter edge and the component.

According to another aspect, the adapter is preferably formed as an adapter plate freely protruding beyond the welded/soldered connection, parallel to the surface extension of the component and formed at the free end connected to the grounding bolt. In this way, on the one hand vibrations introduced at the component side are transmitted to the grounding bolt attenuated on their way across the adapter plate, which is connected in a vibration-capable manner, and on the other hand a direct adapter contact with the component is avoided not only at the welded/soldered connection, but also at the rest of the adapter surfaces, for corrosion protection reasons.

If, in certain applications, especially when the ground connection is situated in the exterior region of a motor vehicle, the contact-free attachment of the adapter to the component in combination with the controlled material transfer at the welded/soldered connection in themselves are not enough for a constantly effective corrosion protection, the ground connection can additionally be coated with a corrosion protection layer.

It has proven to be especially advantageous to produce the welded/soldered connection by way of the known cold metal transfer method with changing polarity and in this case, to organize the polarity change in variable manner according to the particular material pairing at the welded/soldered connection.

Other objects, advantages and novel features of the present invention will become apparent from the following detailed description of one or more preferred embodiments when considered in conjunction with the accompanying drawings.

BRIEF DESCRIPTION OF THE DRAWINGS

The invention shall be explained more closely below with the aid of two exemplary embodiments in connection with the figures.

FIGS. 1A and B are highly schematic illustrations of a ground connection designed according to the invention in side view (A) and top view (B).

FIGS. 2A and B are highly schematic representations of another exemplary embodiment of the invention corresponding to FIG. 1, again in side view (A) and top view (B).

DETAILED DESCRIPTION OF THE DRAWINGS

The ground connection shown in the figures serves for the mechanical and electrical connection of the cable shoe 1 of a high-load electrical grounding conductor 2 to an aluminum component and, especially, a vehicle component 3. As its main parts, it contains a grounding bolt 4 made of steel and a thread element 5 which can be screwed to it, in the form of a threaded nut, which can be tightened with high tightening torque against the cable shoe 1 of the grounding conductor 2 either as a flanged nut and/or with interpositioning of a lock washer 6, so that it is secured with a correspondingly large bias force between the thread element 5 and a corresponding contact area 7 of the grounding bolt 4.

The electrical and mechanical connection of the grounding bolt 4 on the aluminum component 3 is produced by an interposed adapter 8 in the form of a zinc-plated steel plate, with one end section of which the grounding bolt 4 is fusion welded—at 9—over a large area and consisting of the same material, for example by way of a drawn arc stud welding. At the end opposite the grounding bolt 4, the adapter plate 8 is provided with a straight profiled edge section 10 and secured load-free to the aluminum component 3 by a welded/soldered connection 11. It is important that the adapter plate 8 be held at a distance from the aluminum component 3 on its entire underside and that the intervening gap s not be lost also at the adapter edge 10 when making the welded/soldered connection 11, but instead only be filled up and bridged over by it.

The welded/soldered connection 11 is produced by the cold metal transfer method with aluminum as additional material and changing polarity. This produces a controlled material transfer with a large-area fusion weld connection at the side with the aluminum component 3 and an equally large-area soldered connection with the zinc plating as flux on the side with the correspondingly profiled adapter edge 10. For different kinds of aluminum/steel pairings, the polarity change of the cold metal transfer process may be variably adjustable.

The ground connection shown in FIG. 2, in which the components corresponding to the first exemplary embodiment are characterized by the same reference numbers, differs from the latter primarily in that the adapter 8 is formed as a support plate 12 with a broader surface and as a single piece with the grounding bolt 4, being secured on both sides by a welded/soldered connection 11 to the outer edges 10 on the aluminum component 3, the outer edges 10 once again being zinc-plated and having a straight profile, wherein the edge profile is again selected in such a way that a large-area soldered connection is produced at the side with the support plate 12. In this exemplary embodiment as well, the support plate 12 when making the welded/soldered connections 11 is held at a sufficiently large distance from the component 3 in order to avoid corrosion phenomena, so that once again a controlled material transfer occurs in the welded/soldered connections 11 in the intervening gap s at the support plate edges 10, without direct contact with the component. Otherwise, the construction and function are the same as in the above-described exemplary embodiment.

If necessary, the corrosion resistance of the described ground connections especially when they are used in the exterior region under harsh operating conditions can be further improved by coating them afterwards with a corrosion protection layer, at least in the region of their welded/soldered connections 11.

Many modifications are possible in the context of the invention. Thus, the grounding bolt 4 and/or the adapter 8 may consist of materials other than steel which are suitable for fusion welding to each other. Moreover, the ground connection may also be used for purely mechanical fastening of a component not compatible with aluminum on a vehicle component made of aluminum, independently of its electrical conductivity.

LIST OF REFERENCE NUMBERS 1 cable shoe
2 ground conductor
3 aluminum component
4 grounding bolt
5 thread element
6 lock washer
7 contact area
8 adapter
9 fusion welded/connection
10 adapter edge
11 welded/soldered connection
12 adapter plate
s gap The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A ground connection for an aluminum component, comprising:
    a grounding bolt which is fastenable to said component;
    an adapter interposed between the grounding bolt and said component, the adapter extending over a surface and being composed of a material which exhibits greater strength than the aluminum component and differs in electrochemical potential series;
    a threaded element which clamps a cable shoe of a ground conductor on a corresponding contact area of the grounding bolt, wherein
        the grounding bolt and the adapter are composed of materials which are matched to one another so as to prevent corrosion and are connected to one another in a cohesive manner,
        the adapter is zinc-plated at least on a side of the component and is fastened, in a position in which the adapter is not in contact with the component, to the component over a large surface area by a welded/soldered connection produced using aluminum as an additional material,
    the welded/soldered connection comprises of a fillet weld running continuously at an edge of the zinc-plated adapter, and
    the adapter is formed as an adapter plate freely protruding beyond the welded/soldered connection, parallel to a surface extension of the component, and formed at a free end connected to the grounding bolt.

2. The ground connection as claimed in claim 1, wherein the adapter is molded as a single-piece with the grounding bolt.

3. The ground connection as claimed in claim 1, wherein the adapter is prefabricated and zinc-plated separately from the grounding bolt and then welded to the grounding bolt.

4. The ground connection as claimed in claim 1, wherein the adapter and the component are coated with a corrosion protection layer at least in a region of the welded/soldered connection.

5. The ground connection as claimed in claim 1, wherein the welded/soldered connection is produced by way of cold metal transfer with changing polarity.

6. The ground connection as claimed in claim 5, wherein the polarity change is variably adjustable according to the material pairing of adapter and component.

7. The ground connection as claimed in claim 1, wherein the adapter is made of steel.

8. The ground connection as claimed in claim 1, wherein the aluminium component is a vehicle body component.

* * * * *